United States Patent
Vincent et al.

(10) Patent No.: US 10,893,399 B2
(45) Date of Patent: Jan. 12, 2021

(54) DEVELOPMENT OF A MASTER SUBSCRIPTION AT A HOME SUBSCRIBER SERVER

(71) Applicant: HEWLETT PACKARD ENTERPRISE DEVELOPMENT LP, Houston, TX (US)

(72) Inventors: Mario Bertram Vincent, Bangalore (IN); Aruna Sajjan, Bangalore (IN); Phani Kumar Jagannadha Tangirala, Bangalore (IN); Ramya Nagarajan, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/691,587

(22) Filed: Aug. 30, 2017

(65) Prior Publication Data

US 2019/0069123 A1 Feb. 28, 2019

(51) Int. Cl.
| | |
|---|---|
| *H04W 4/70* | (2018.01) |
| *H04W 8/04* | (2009.01) |
| *H04W 8/18* | (2009.01) |
| *H04W 88/16* | (2009.01) |
| *H04W 8/06* | (2009.01) |
| *H04W 84/18* | (2009.01) |

(52) U.S. Cl.
CPC .............. *H04W 4/70* (2018.02); *H04W 8/04* (2013.01); *H04W 8/06* (2013.01); *H04W 8/186* (2013.01); *H04W 84/18* (2013.01); *H04W 88/16* (2013.01)

(58) Field of Classification Search
CPC ....... H04W 4/70; H04W 12/04; H04W 12/06; H04W 4/80; H04W 8/04; H04W 8/186; H04W 88/16; H04L 63/065
See application file for complete search history.

(56) References Cited

U.S. PATENT DOCUMENTS

| | | | |
|---|---|---|---|
| 8,391,226 B2 | 3/2013 | Rune | |
| 9,392,459 B2 | 7/2016 | Starsinic et al. | |
| 2012/0296968 A1* | 11/2012 | Lin | H04W 8/26 709/204 |
| 2015/0134743 A1 | 5/2015 | Heo et al. | |

(Continued)

OTHER PUBLICATIONS

Keyur K Patel et al., "Internet of Things—IOT: Definition, Characteristics, Architecture, Enabling Technologies, Application & Future Challenges," International Journal of Engineering Science and Computing, May 2016, pp. 6122-6131, vol. 6, No. 5.

(Continued)

*Primary Examiner* — George Eng
*Assistant Examiner* — Umair Ahsan
(74) *Attorney, Agent, or Firm* — Hewlett Packard Enterprise Patent Department

(57) ABSTRACT

Examples herein relate to development of a master subscription at a home subscriber server (HSS). Examples disclose based on an activation from a gateway, the development of the master subscription at the HSS. The master subscription is exclusive to a group of Internet of Things (IoT) devices tethered to the gateway. Based on the master subscription developed at the HSS, a message, intended for a target IoT device among the group of IoT devices tether to the gateway, is transmitted to the gateway.

20 Claims, 7 Drawing Sheets

(56) References Cited

U.S. PATENT DOCUMENTS

2018/0262863 A1* 9/2018 Kodaypak ............... H04W 4/70
2018/0262941 A1* 9/2018 Huang .............. H04W 28/0221

OTHER PUBLICATIONS

Syed Husain et ai., "Recent Trends in Standards Related to the Internet of Things and Machine-to-Machine Communications," Journal of Information and Communication Convergence Engineering, Dec. 2014, pp. 228-236.

* cited by examiner

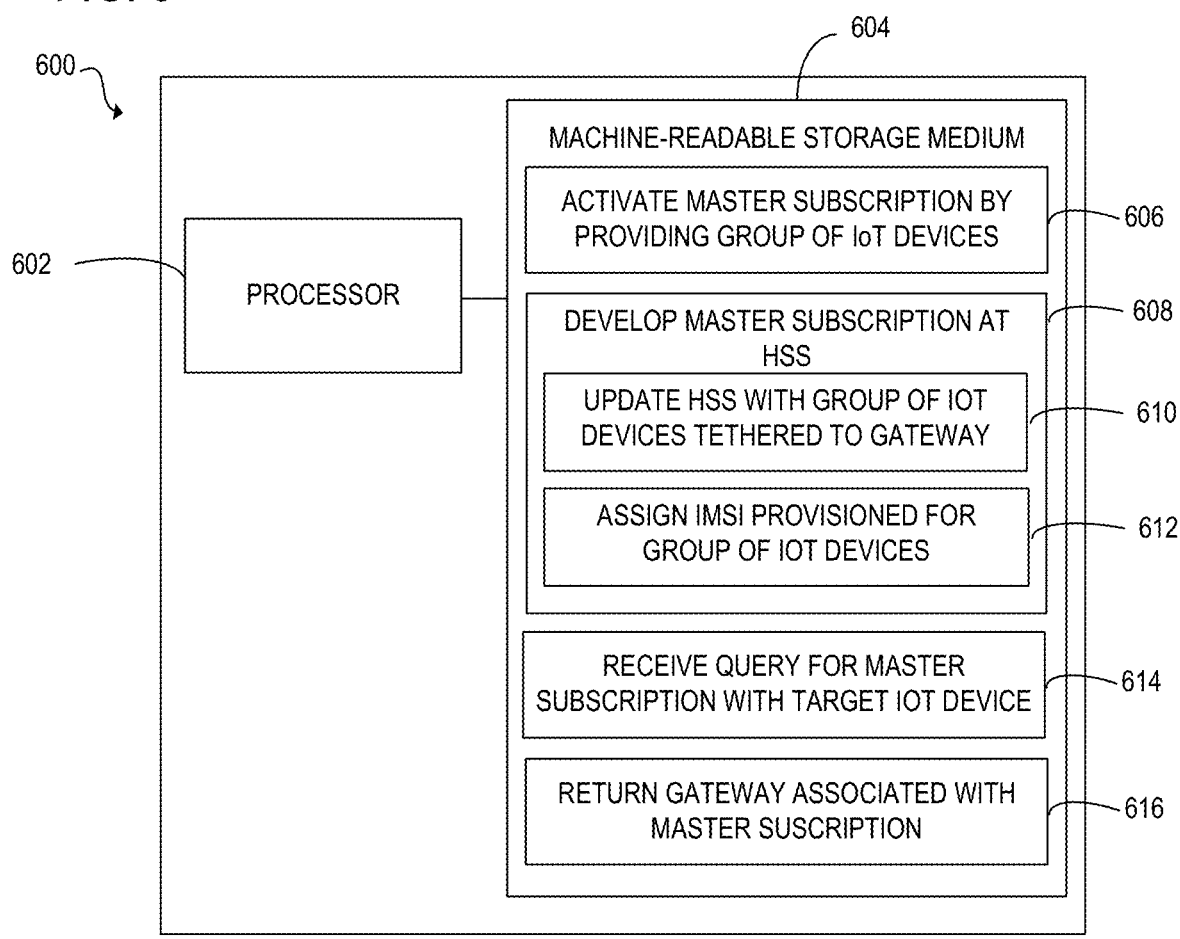

DEVELOPMENT OF A MASTER SUBSCRIPTION AT A HOME SUBSCRIBER SERVER

BACKGROUND

In today's ever connected world, the use of Internet of Things (IoT) is set to explode over the next decade. In using IoT, physical devices are embedded with technology that provide network connectivity to enable the devices to collect and exchange data. However, there are several anticipated challenges with the explosion of IoT.

BRIEF DESCRIPTION OF THE DRAWINGS

In the accompanying drawings, like numerals refer to like components or blocks. The following detailed description references the drawings, wherein:

FIG. 6 is a block diagram of an example computing device with a processing resource to execute instructions in a machine-readable storage medium activating and developing a master subscription exclusive to a group of IoT devices tethered to a gateway in accordance with the present disclosure.

DETAILED DESCRIPTION

Figure 1A:
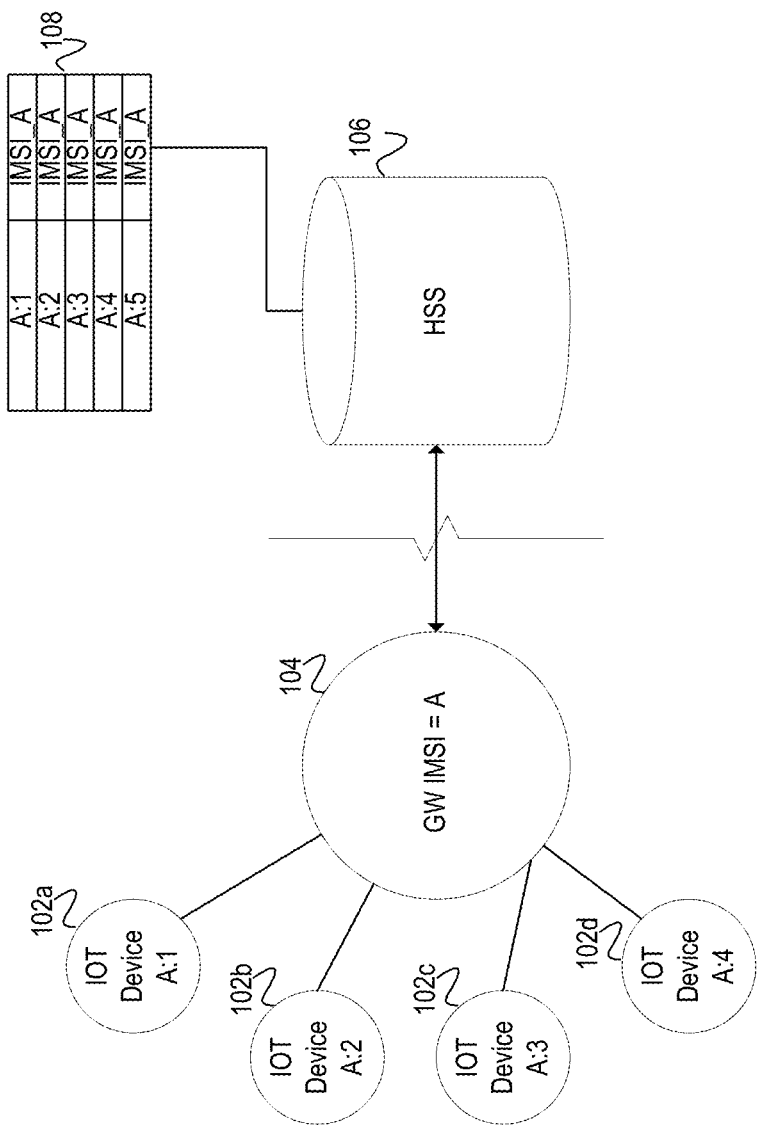
FIGS. 1A-1B illustrate an example system including a gateway tethered to a group of IoT devices and a server to develop a master subscription exclusive to the group of IoT devices in accordance with the present disclosure.

There are several anticipated challenges with the explosion of IoT. One such challenge includes the increased network traffic among the number of IoT devices in a core network (e.g., 2G, 3G, 4G, 5G, LTE, etc.). The network traffic increases with the increased number of IoT devices. For example, each IoT device may attach to a network and update the status and/or location. As such, the network initiated and update messages increases the network traffic which may lead to latency and other efficiency issues in the network. For example, in a machine-type communication (MTC), a network initiated device may trigger on the control plane, to "awaken" a device which enables the device to establish a user plane data connection. In this example, a front-end gateway is connected to the network while the IoT devices are connected to the gateway via energy efficient protocol, such as ZigBee. An MTC server may have a proprietary application layer protocol in which to communicate to the gateway; however, this has led to a fragmented landscape in which the MTC server may be unable to communicate to other vendor gateways without the use of an adaption layer to mediate the communication using that vender protocol specific to the gateway. Additionally, the IoT devices may be connected to different types of networks such as a telecom network (e.g., 3G, 4G, 5G, LTE) and/or wireless network (e.g., Wi-Fi). Consider the situation of how easy a phone call may be placed to another phone in the world, yet it may be difficult to determine if the vending machine at an office may have specific type of soda.

Accordingly, the present disclosure provides a master subscription mechanism that utilizes an existing telecom core network infrastructure (e.g., home subscriber server). Using a master subscription corresponding to a group of IoT devices reduces the network traffic as a front-end gateway manages the communications to the connected group of IoT devices. Additionally, the management of the master subscription at a home subscriber server (HSS) for a group of IoT devices reduces the burden on the HSS. The burden reduction comes about as the HSS manages a master subscription for a group of IoT devices rather than individual subscriptions to each IoT device. Reducing the burden on the HSS may also increase the network efficiency.

Creating the master subscription on the HSS where machine type communication (MTC) devices including both IoT and machine-to-machine devices are concerned allows a single subscription (e.g., the master subscription) to control the group of MTC devices. The master subscription is created in existing network infrastructure such that an existing gateway server functions as a frontend device which accepts and modifies connections to the MTC devices (e.g., IoT devices).

In another example, each master subscription is assigned a unique international mobile subscriber identity (IMSI). Unique IMSI values are limited while IoT devices may be innumerous. By assigning the IMSI value to the group of IoT devices rather than to individual IoT devices reduces the number of used pre-assigned IMSI values. In this manner, the IMSI value is associated with the group of IoT devices in the master subscription rather than a unique IMSI value to each individual IoT device.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "multiple," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. Additionally, the term "tethered" is understood to mean a connection and/or attachment to a network component. As such, these terms may be used interchangeably throughout. Further, the term "IoT device" is understand to include a machine type of communication device and machine-to-machine communication type devices.

The foregoing disclosure describes a number of example implementations for developing a master subscription exclusive to a group of IoT devices tethered to a gateway. The disclosed examples may include systems, devices, computer-readable storage media, and methods for increasing the network affinity index. For purposes of explanation, certain examples are described with reference to the components illustrated in FIGS. 1A-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Figure 1B:
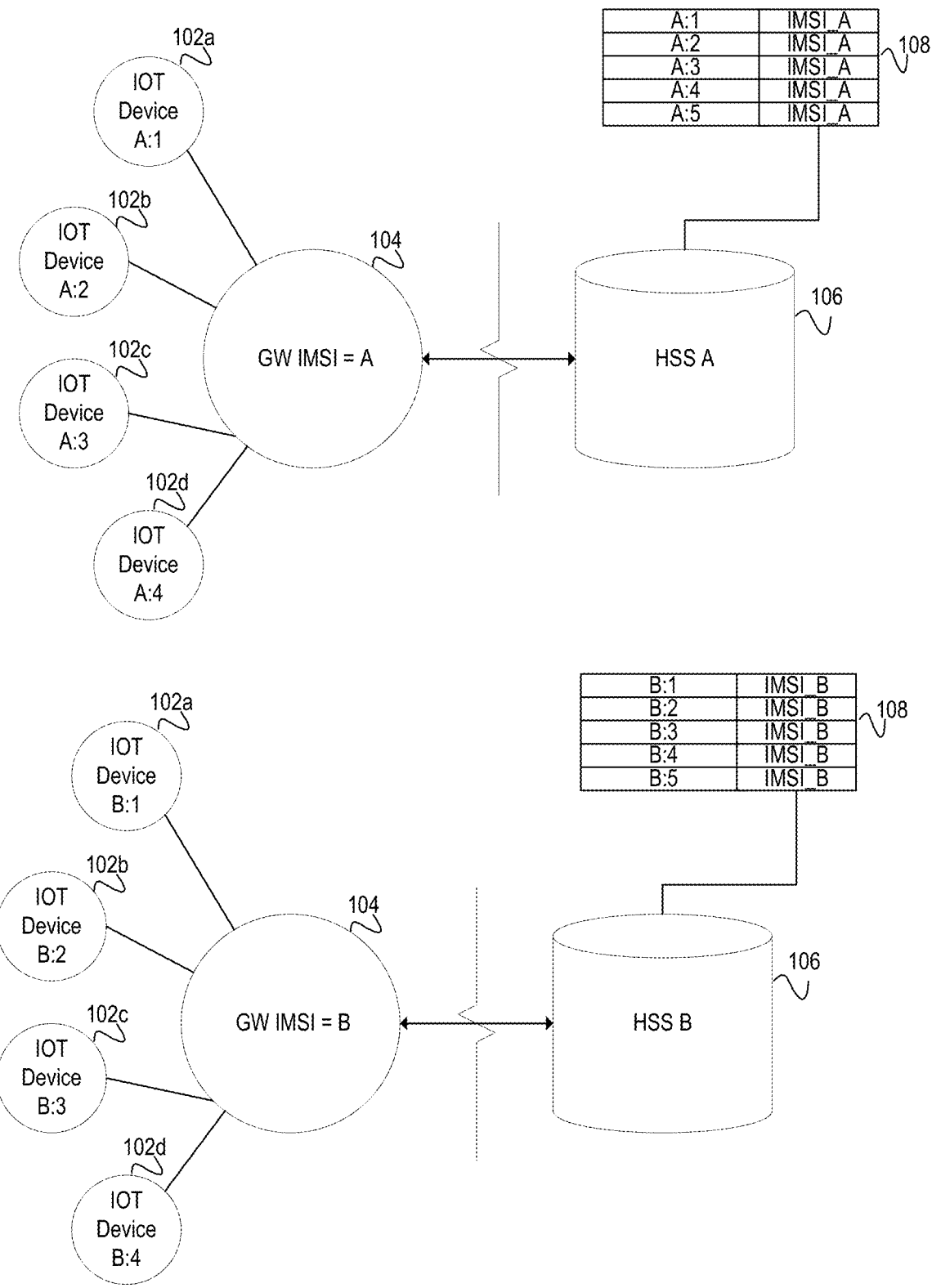

FIGS. 1A-1B illustrate an example system including a group of IoT devices 102a-102d tethered to a respective gateway 104 (Gateway A, Gateway B). Respective gateways 104 communicates to respective HSS 106 (HSS A, HSS B) to each develop master subscription 108. Each group of IoT devices 102a-102d (A:1-A:4 and B:1-B:4) are associated with a home gateway, such as respective gateway 104. The home gateway is the gateway which each grouping of IoT device 102a-102d are attached. HSS 106 develops master subscription 108 as a mechanism to track which IoT devices are attached to which gateway. Tracking these IoT devices, HSS 106 can accurately deliver communications intended for a target IoT device among IoT devices 102a-102d to respective gateway 104. FIGS. 1A-1B illustrate a wired and/or wireless system in which IoT devices 102a-102d may receive and/or transmit communications. As such, the systems in FIGS. 1A-1B represent a telecommunication network such as a 4G-type domain, 2G/3G-type domain, 5G-type domain, LTE type domain, non-3GPP access domain, such as a WLAN-type domain, and/or combination thereof. Although FIGS. 1A-1B illustrate the system as including components 102a-102d, 104, 106, and 108, implementations should not be so limited as FIGS. 1A-1B may also include radio tower(s), base station(s), and other components (not illustrated) within which the group of IoT devices 102a-102d may communicate. This implementation may be illustrated in a later figure.

Turning to FIG. 1A, IoT devices 102a-102d are physical devices and may include connected devices and smart devices that are embedded technology, such as sensors and network connectivity, that enable these devices to collect and exchange data. IoT devices 102a-102d may use a wireless personal area network (WPAN) technology, such as Bluetooth, ZigBee, or other technology to attach to gateway 104. In implementations IoT devices 102a-102d include a combination of different types of MTC devices, such as a mobile device, laptop, server, networking component, or combination thereof. The group of IoT devices 102a-102d are attached exclusively to gateway 104, such that each IoT device 102a-102d are unable to attach simultaneously to multiple gateways. This means, each IoT device 102a-102d can be currently tethered to a single gateway, such as gateway 104.

Gateway 104 is a networking component that connects to the network in FIG. 1A using the assigned value when powered on. Gateway 104 connects to the network via a standard attachment procedure for telecommunications, such as following attachment procedure 4G, 5G, LTE, etc. As such, gateway 104 provides the capability for the group of IoT devices 102a-102d to connect to the network. Additionally, gateway 104 includes subscriber information of IoT devices 102a-102d and the assigned value to master subscription 108 in HSS 106. In this manner, gateway 104 manages each of the group of IoT devices 102a-102d and communications to IoT devices 102a-102d.

HSS 106 is a type of server which maintains registrations of IoT devices 102a-102b via master subscription(s) 108. HSS 106 receives updates from gateway 104 that includes the group of IoT devices currently tethered to gateway 104 using network communications, such as Diameter, RADIUS, or other type of authentication, authorization, and accounting protocol for networks. In this manner, gateway 104 may provide updates, such as newly tethered IoT devices and/or IoT devices disconnected from gateway 104. In this implementation, gateway 104 transmits the list of IoT devices 102a-102d to HSS 106. HSS 106 maintains the list of attached IoT devices 102a-102d and a mapping of the IoT device identification to the master subscription 108 of gateway 104. In one implementation, master subscription 108 is assigned an international mobile subscriber identity (IMSI) that is a unique number representing gateway 104. For example in FIG. 1A, IoT devices A:1-A:4 are each associated with IMSI_A representing gateway 104. In this manner, HSS 106 may lookup the identification of a target IoT device for transmission of a communication intended for the target IoT device to the home gateway. Based on the HSS 106 receiving a query to look up the corresponding gateway, the HSS 106 proceeds to perform the look-up in master subscription 108. Identifying the corresponding gateway, the HSS may proceed to transmit the identification of that gateway attached to the target IoT device so that the communications intended for that target IoT device are transmitted to gateway 104.

Master subscription 108 is a mapping that includes the list of identifications for the group of IoT devices 102a-102d and the master subscription identification. For example, assume a machine type communication (MTC) server wants to send a device trigger message to one of the IoT devices 102a-102d. The MTC server would initially query HSS 106 for the current location of the target IoT device using the target IoT device's identification (A:1-A:4). Although the IoT device's unique identification is listed as A:1-A:–4, implementations should not be limited as the unique identification IOT devices is <Gateway IMSI>:<Subid>—for instance A:1, A:2 etc. Another possibility could be <Gateway MSISDN>:<Subid>. Yet another possibility could be any unique string identity that could be resolved to the MSISDN or IMSI.

Based on receipt of the query, HSS 106 in turn, performs a lookup in the mapping of master subscription 108 and provides the currently attached gateway for that master subscription 108. In other implementations, in response to a request to resolve an identification of an IoT device is directed to HSS 106. HSS 106 checks the listings of master subscription 108 and returns the identity of the home gateway and/or master subscription IMSI (IMSI_A), assuming the target IoT device is attached to the home gateway. Otherwise, HSS 106 returns the identity of the foreign gateway (not illustrated), assuming the target IoT device is attached to that foreign gateway that is associated with a remote HSS. These implementations allow the delivery of messages intended to the target IoT device to the correct gateway. Although master subscription 108 is illustrated as a table, implementations should not be limited as master subscription 108 may include a listing, mapping, or other type of data format.

Turning now to FIG. 1B, different gateways 104 represent a home gateway to respective IoT devices 102a-102d (A:1-A:4 and B:1-B:4). In the situation that one of the IoT devices 102a-102d is newly attached to a foreign IoT gateway (e.g., non-home gateway). In this example, HSS 106 notifies the remote HSS 106 (e.g., HSS corresponding to home gateway) of the attachment status and the foreign gateway updates the status of the IoT device within its master subscription 108.

A request made to HSS 106 (HSS A or HSS B) to resolve an identity of a target IoT device among IoT devices 102a-102d may be directed to the home HSS. The home HSS in turn performs a lookup function to return an address of the local gateway. Assuming the target IoT device is attached to its home gateway, the home HSS will return the address of the home gateway. Otherwise, assuming the target IoT device is attached to the foreign gateway, the home HSS returns the address of the foreign gateway. These examples ensure the message intended to that target IoT device is delivered to the correct gateway 104.

Figure 2:
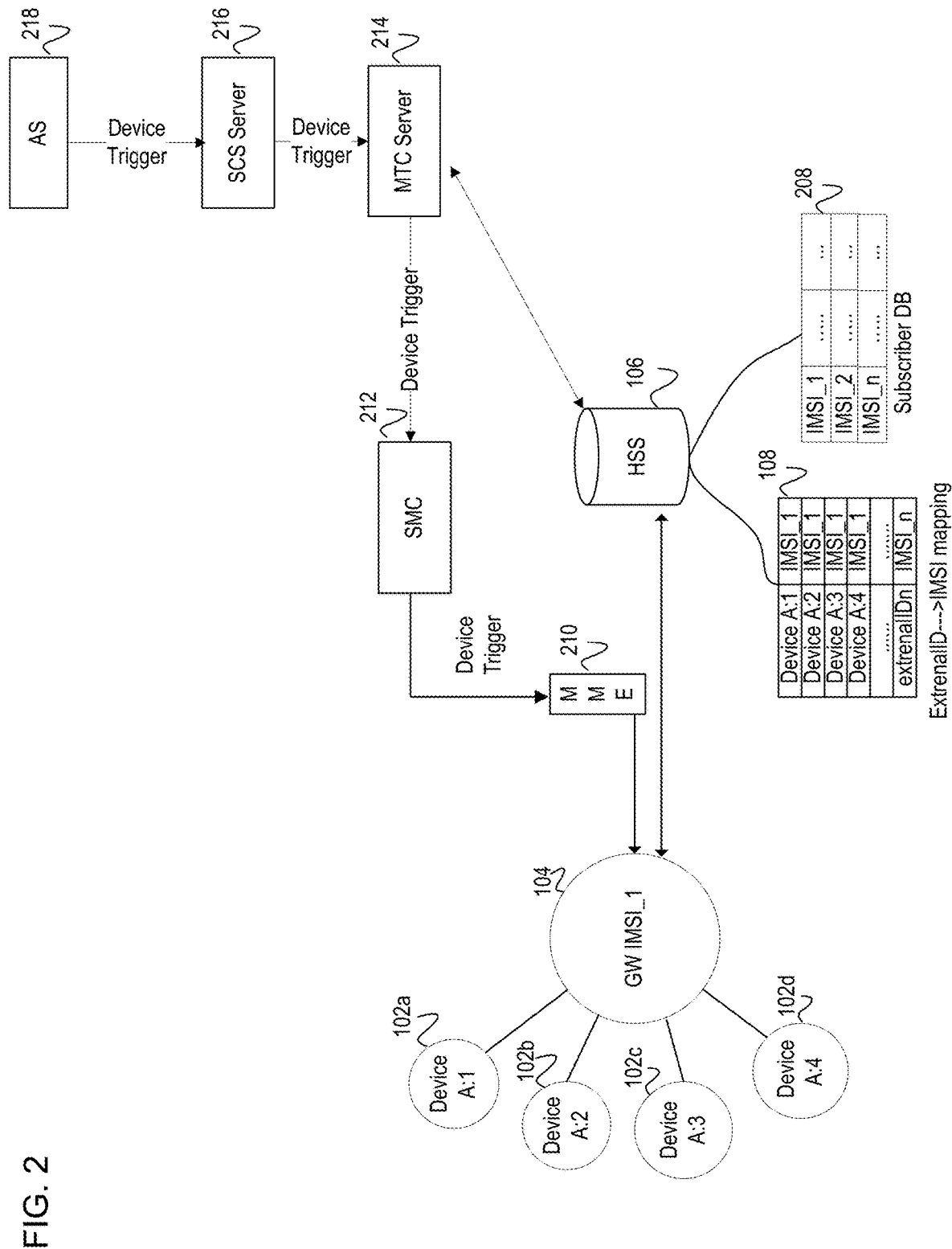
FIG. 2 illustrates an example system to communicate a message intended for a target IoT device among a group of IoT devices tethered to a gateway based on a master subscription developed at a server in accordance with the present disclosure.

FIG. 2 illustrates an example system to communicate a message intended for a target IoT device among a group of IoT devices 102a-102d tethered to a gateway 104 based on a master subscription 108 developed at HSS 106. Specifically, FIG. 2 illustrates the communications between networking components 104, 106, 108, 208, 210, 212, 214, 216, and 218 to send a device trigger message intended for a target IoT device (e.g., Device Trigger) among the group of IoT devices 102a-102d.

In response to the message generation for the intended for the target IoT device, application server (AS) 218 initiates the message to service capability server (SCS) 216. The IoT device trigger message may be initiated by application server 218 and/or by an external device (not illustrated). SCS server 216 transmits the message to machine type communications (MTC) server 214. In turn, MTC server 214 queries HSS 106 with the identification (external ID) of the intended target IoT device for the current gateway in which the target IoT device is attached. In this implementation, MTC server 214 queries HSS over an S6m interface. This authorizes SCS server 216 to request a specific service (e.g., IoT device trigger message) and to retrieve subscription information and routing information from HSS 106.

Based on the query from the SCS server 216, HSS 106 performs a lookup on the table in subscriber database 208. As indicated in subscriber database 208, each different master subscription is listed by the assigned IMSI (IMS_1, IMSI_2, ISMI_n). Each different assigned IMSI represents a different group of IoT devices. For example, IMSI_1 includes one group of IoT devices, while IMSI_2 represents a different group of IoT devices. Each different IMSI corresponds to a different gateway. In this example, IMSI_1 corresponds to gateway 104 and ISMI_2 corresponds to a different gateway (not illustrated).

Using subscriber database 208, HSS may proceed to perform the lookup function for master subscription mapping 108. In this manner, each device is listed according to an identifier (Device A:1-Device A:4) with a different assigned IMSI. HSS 106 may locate the target IoT device by the identifier and to which assigned master subscription value. Using the master subscription value, HSS 106 can identify gateway 104 in which the target IoT device is attached. As such, HSS 106 returns the identified gateway 104 and address to MTC server 214.

Based on the address of identified gateway 104, MTC server 214 proceeds to transmit the target IoT device trigger message over a T4 interface to short message center (SMC) server 212. SMC server 212 triggers a short message to gateway 104 through mobile management entity (MME) 210. It is assumed in this implementation, that the target IoT device message would include the identification of the target IoT device. Gateway 104 receives the target IoT device message and based on the identification of the target IoT device, gateway 104 transmits to that target IoT device.

Figure 3:
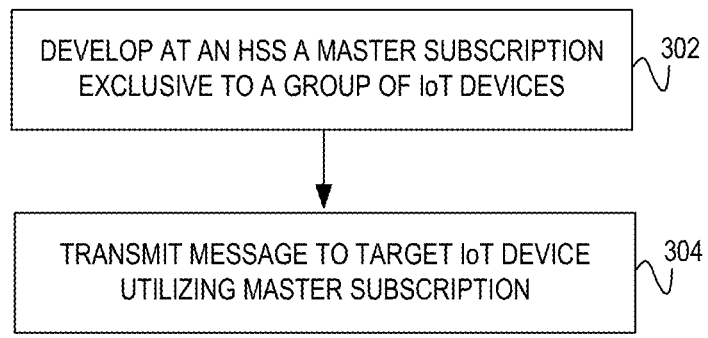
FIG. 3 illustrates an example flow diagram to develop a master subscription exclusive to a group of IoT devices tether to a gateway in accordance with the present disclosure.
Figure 4:
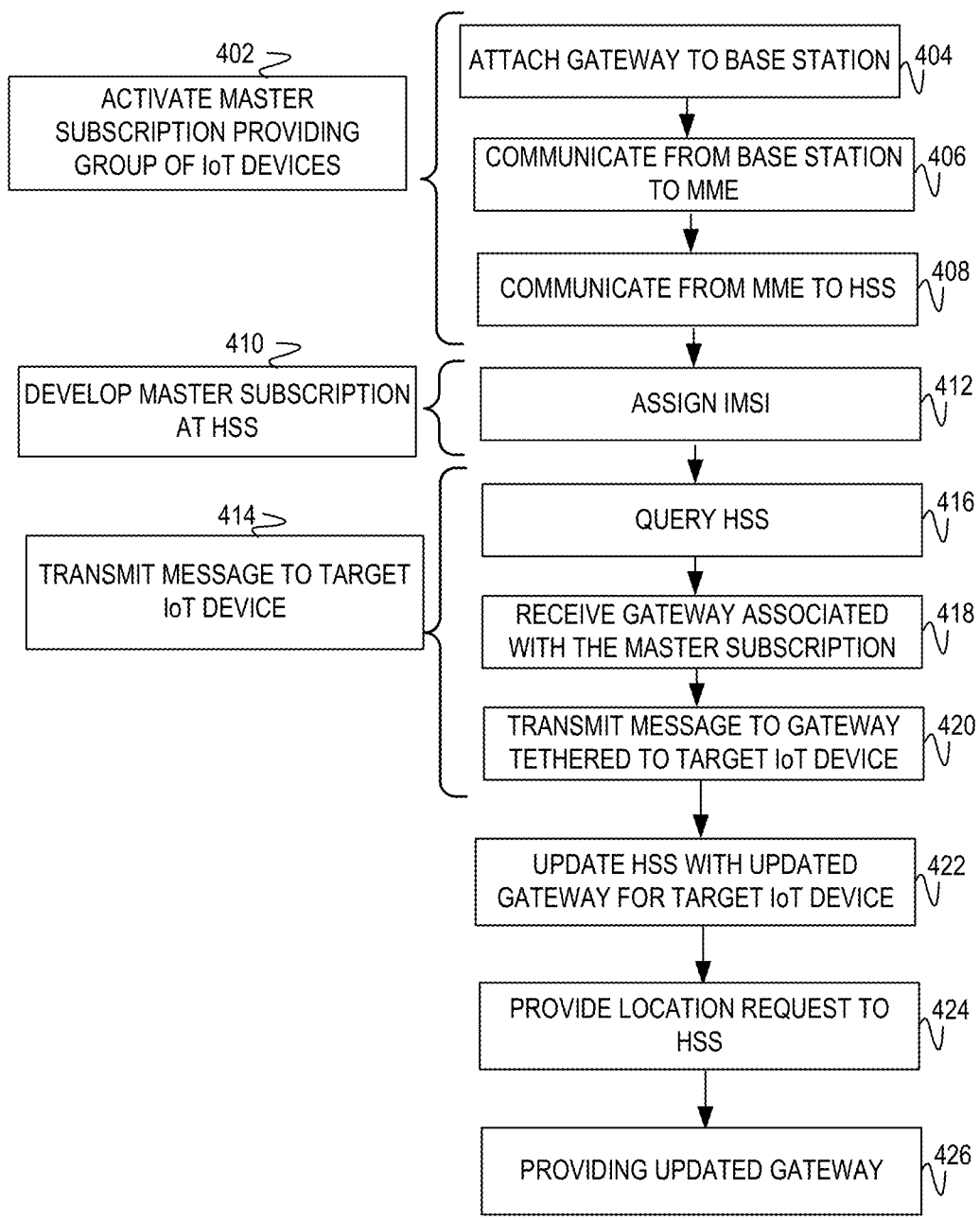
FIG. 4 illustrates an example flow diagram to activate and develop a master subscription at a server to transmit a message to a target IoT device in accordance with the present disclosure.

Referring now to FIGS. 3 and 4, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 3-4 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 3 is a flow diagram illustrating a method executable by a network controller to develop a master subscription exclusive to a group of IoT devices tethered to a gateway in accordance with the present disclosure. In discussing FIG. 3, references may be made to the components in FIGS. 1-2 to provide contextual examples. In one implementation, HSS 106 as in FIGS. 1-2 executes operations 302-304 to develop the master subscription. In another implementation, gateway 104 and HSS 106 operate in conjunction to execute operations 302-304. Although FIG. 3 is described as implemented by HSS 106, it may be executable on other suitable hardware components. For example, FIG. 3 may be implemented in the form of executable instructions on a machine-readable storage medium 504 and 604 as in FIGS. 5-6.

At operation 302, the HSS develops the master subscription exclusive to the group of IoT devices currently tethered to a specific gateway. At operation 302, each IoT device in the group of IoT devices may each tether itself to the gateway such that the gateway manages communications to the individual IoT devices. Each gateway may including a different set of IoT devices. Alternatively, different gateways include different groups of IoT device and as such, each master subscription allocated to each gateway is different. In this manner, the master subscription is a unique allocation or representation for the group of IoT devices specific to that particular gateway. Each IoT device may communicate to its respective gateway for tetherment. Tetherment is a process in which each IoT device connects to the gateway such that the gateway can manage the group of currently tethered IoT devices. In further implementations, based on each IoT device going through tetherment, each gateway provides a list of the currently tethered IoT devices to the HSS. Providing the list of currently tethered IoT devices, the HSS may proceed to develop the master subscription for the group of currently tethered IOT devices. In another implementation, the HSS develops the master subscription exclusive to the group of currently tethered IoT devices by assigning an IMSI to that respective group of IoT devices. As such, each different group of IoT devices is assigned a different IMSI representing that master subscription. In this implementation, each gateway may correspond to a different master subscription. Thus, each gateway may be associated with a different master subscription and assigned a different international mobile subscriber identity (IMSI). In this implementation, each master subscription has a unique IMSI value, meaning each gateway has a one-to-once correspondence to each master subscription.

At operation 304 based on the master subscription, a message intended for a target IoT device, among the group of IoT devices currently tethered to the gateway, is transmitted to the gateway. At operation 304, the HSS performs a lookup to identify the current gateway for the target IoT device. As such, the current gateway may be labeled according to the master subscription, such that the master subscription represents each respective gateway. Based on the query, the HSS returns the current gateway tethered to the target IoT device. In turn, the message is transmitted to the current gateway for communication to that target IoT device. In a further implementation, the HSS receives updates from the gateway that includes the group of IoT devices disconnected and/or newly attached to the gateway. As such, the gateway provides the updates of the group of IoT devices to the HSS.

FIG. 4 is a flow diagram illustrating a method to activate and develop a master subscription at an HSS for a group of IoT devices attached to a gateway. Based on developing the master subscription for the group of IoT devices at the HSS, a message intended to a target IOT device may be transmitted to the gateway. The gateway, in turn, manages the communications for that attached and targeted IoT device. In discussing FIG. 4, references may be made to the components in FIGS. 1-2 to provide contextual examples. In one implementation, HSS 106 as in FIGS. 1-2 executes operations 402-426 to develop the master subscription. In another implementation, gateway 104 and HSS 106 operate in conjunction to execute operations 402-426. Although FIG. 4 is described as implemented by HSS 106, it may be executable on other suitable hardware components. For example, FIG. 4 may be implemented in the form of executable instructions on a machine-readable storage medium 504 and 604 as in FIGS. 5-6.

At operation 402, the network controller activates the master subscription at the HSS. The activation is initiated based on the gateway providing the group of IoT devices currently attached to the gateway to the HSS. In one implementation, the HSS initiates the activation of the master subscription by proceeding to operations 404-408.

At operation 404-408 the network controller initiates the activation of the master subscription through the communications executed at operations 404-408. In one implementation, the communications at operations 404-408 are performed utilizing a specific communications protocol, such as Diameter, RADIUS, or other type of authentication, authorization, and accounting protocol for networks. At operation 404, the group of IoT devices are tethered to the gateway. The gateway in turn, attaches to the base station to initiate communication into the network. The base station in turn communicates to a mobility management entity (MME). The MME proceeds to communicate to the HSS to provide the group of IoT devices currently tethered to the gateway such that the network controller may proceed to develop the master subscription exclusive to that group of IoT devices.

At operation 410, the network controller develops the master subscription at the HSS. In one implementation, the network controller assigns an international mobile subscriber identity (IMSI) to the specific group of IoT devices at operation 412. Operation 410 may be similar in functionality to operation 302 as in FIG. 3.

At operation 412, the network controller assigns the IMSI value to the master subscription associated with the group of IoT devices. Unique IMSI values are limited while IoT devices may be innumerable. By assigning the IMSI value to the group of IoT devices rather than to individual IoT devices reduces the number of used pre-assigned IMSI values. In this manner, the IMSI value is associated with the group of IoT devices in the master subscription rather than a unique IMSI value to each individual IoT device. At this operation, a network administrator may allocate a list of IMSI values for assigning to various master subscriptions. As such, the network controller can select which IMSI value to assign to the particular master subscription.

At operation 414, the network controller may transmit a message intended to a specific IoT device to the attached gateway associated with the master subscription. In one implementation, the network controller may proceed to operation 416-420 to query the HSS for the master subscription associated with the intended IoT device. Upon receiving the master subscription and attached gateway, the network controller may proceed to transmit the message to the gateway. In turn the gateway manages the message for transmission to the intended IoT device. Operation 414 may be similar in functionality to operation 304 as in FIG. 3.

At operations 416-420 based on a query, the HSS may respond with returning the gateway currently associated with the master subscription assigned to the group of IoT devices including the targeted IoT device. Based on receiving the gateway associated with the master subscription, the network controller transmits the message to the gateway that is currently tethered (e.g., attached) to the target IoT device. Providing the gateway that is currently tethered to the target IoT device, the network controller transmits the message to that gateway. In turn, that gateway manages the communications and messages intended to the target IoT device that is attached.

At operation 422 based on the specific IoT device re-attaching to a different gateway, the different gateway proceeds to update the HSS with the updated attachment. In this manner, the different gateway updates the HSS with the newly attached IoT device associated with the master subscription at that different gateway. This allows the gateway to manage the locations for each of the attached group of IoT devices rather than the HSS. In another implementation, each gateway may periodically send which group of IoT devices are currently attached. This allows the HSS to make the further updates to associate the appropriate IoT devices with each master subscription.

At operation 424 based on a request at the HSS for the updated gateway for the targeted IoT device, the HSS may provide which gateway is currently attached to the targeted IoT device. The gateway is associated to the master subscription such that upon returning the master subscription associated with the targeted IoT device, the HSS can discern which gateway is currently attached to the targeted IoT device.

At operation 426 based on the request for the updated gateway, the HSS returns the updated gateway. In this manner, the HSS can identify which gateway is currently attached to the targeted IoT device for message transmission to the updated gateway. The updated gateway, in turn, can relay the message to the targeted IoT device.

Figure 5:
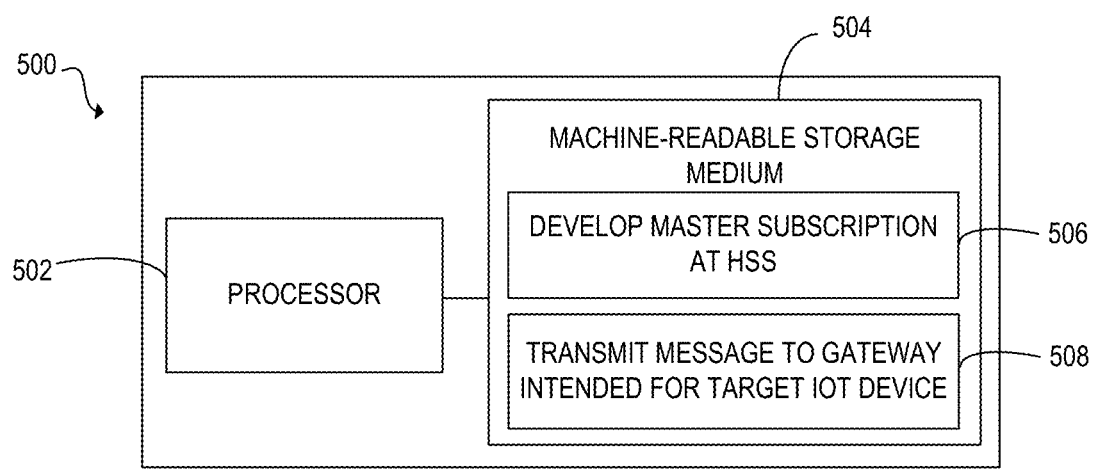
FIG. 5 is a block diagram of an example computing device with a processing resource to execute instructions in a machine-readable storage medium for developing a master subscription in accordance with the present disclosure.

Referring now to FIGS. 5-6, example block diagrams of networking devices 500 and 600 with processing resources 502 and 602 are illustrated to execute machine-readable instructions in accordance with various examples of the present disclosure. The machine-readable instructions represent instructions that may be fetched, decoded, and/or executed by respective processing resources 502 and 602. While illustrated in a particular order, these instructions are not intended to be so limited. Rather, it is expressly contemplated that various instructions may occur in different orders and/or simultaneously with other instructions than those illustrated in FIGS. 5-6.

FIG. 5 is a block diagram of networking device 500 with processing resource 502 to execute instructions 506-508 within machine-readable storage medium 504. Although networking device 500 includes processing resource 502 and machine-readable storage medium 504, it may also include other components that would be suitable to one skilled in the art. For example, networking device 500 may include a controller, memory storage, or other suitable type of component. The networking device 500 is an electronic device with processing resource 502 capable of executing instructions 506-508 and as such embodiments of the networking device 500 include a computing device such as a server, switch, router, wireless access point (WAP), or other type of networking device or embodiments of the networking device 500 include an electronic device such as a computing device, or other type of electronic device capable of executing instructions 506-508. The instructions 506-508 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-508 develop a master subscription. Specifically, the processing resource 502 executes instructions 506-508 to: develop a master subscription exclusive to a group of IoT devices tethered to a gateway that is in communication with the HSS; and based on the developed master subscription, transmit a message intended for a target IoT device among the group of IoT devices to the gateway.

The machine-readable storage medium 504 includes instructions 506-508 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 504 may include an application and/or firmware which can be utilized independently and/or in conjunction with processing resource 502 to fetch, decode, and/or execute instructions of machine-readable storage medium 504. The application and/or firmware may be stored on machine-readable storage medium 504 and/or stored on another location of networking device 500.

FIG. 6 is a block diagram of networking device 600 with processing resource 602 to execute instructions 606-616 within machine-readable storage medium 604. Although networking device 600 includes processing resource 602 and machine-readable storage medium 604, it may also include other components that would be suitable to one skilled in the art. For example, computing device 600 may include a controller, memory storage, or other suitable type of component. The networking device 600 is an electronic device with processing resource 602 capable of executing instructions 606-616 and as such embodiments of the networking device 600 include an electronic device such as a server, switch, router, wireless access point (WAP), or other type of computing device. Other embodiments of the networking device 600 include an electronic device such as a computing device, or other type of electronic device capable of executing instructions 606-616. The instructions 606-616 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-616 to activate and develop a master subscription at an HSS. Specifically, the processing resource 602 executes instructions 606-616 to: activate a master subscription at an HSS from a gateway by providing a group of IoT devices to the HSS; develop the master subscription at the HSS by updating the HSS with a group of IoT devices and assigning an IMSI provisioned for the group of IoT devices; receive a query by the HSS for the master subscription including the target IoT device; and return from the HSS the gateway associated with the master subscription to transmit the message for the intended target IoT device to the gateway.

The machine-readable storage medium 604 includes instructions 606-616 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 604 may include an application and/or firmware which can be utilized independently and/or in conjunction with processing resource 502 to fetch, decode, and/or execute instructions of machine-readable storage medium 604. The application and/or firmware may be stored on machine-readable storage medium 604 and/or stored on another location of networking device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A non-transitory machine-readable storage medium comprising instructions that when executed by a processing resource cause a networking device to:
identify a gateway in a network corresponding to a group of Internet of Things (IoT) devices, wherein the gateway is configured to provide a capability for a group of Internet of Things (IoT) devices to connect to the network, wherein a Home Subscriber Server (HSS) is configured to receive updates from the gateway to which IoT devices of the group of IoT devices are currently tethered, and wherein the gateway and the HSS are different devices;
receive, at the HSS and from the gateway, an identifier for each IoT device within the group of IoT devices tethered to the gateway, wherein tethering allows the group of IoT devices to connect to the network via the corresponding gateway;
develop, at the HSS, a master subscription exclusive to the group of IoT devices;
associate the master subscription to an identifier for the gateway; and
upon receiving a query directed to a target IoT device of the group of IoT devices from a requesting device, use the master subscription, by the HSS, to lookup the identifier for the corresponding gateway and provide the identifier for the gateway to the requesting device, wherein the identifier for the gateway enables transmitting a message from the requesting device to the gateway for routing to the target IoT device within the group of IoT devices.

2. The non-transitory machine-readable storage medium of claim 1 further comprising instructions that when executed by the processing resource cause the networking device to:
assign the master subscription an International Mobile Subscriber Identity (IMSI) that is provisioned for the group of IoT devices.

3. The non-transitory machine-readable storage medium of claim 1 comprising instructions that when executed by the processing resource cause the networking device to:
activate the master subscription at the HSS from the gateway to the HSS.

4. The non-transitory machine-readable storage medium of claim 1 wherein the HSS manages multiple master subscriptions, and each master subscription is associated with a different gateway managing a different group of IoT devices.

5. The non-transitory machine-readable storage medium of claim 1 further comprising instructions that when executed by the processing resource cause the networking device to:
update the HSS, using diameter protocol, with the group of IoT devices tethered to the gateway.

6. The non-transitory machine-readable storage medium of claim 1 comprising instructions that when executed by the processing resource cause the networking device to:
receive, at the HSS, a query for the master subscription for the target IoT device; and
in response to the query, provide the identifier for the gateway.

7. A method, executable by a networking device, the method comprising:
identifying a gateway in a network corresponding to a group of Internet of Things (IoT) devices, wherein the gateway is configured to provide a capability for a group of Internet of Things (IoT) devices to connect to the network, wherein a Home Subscriber Server (HSS) is configured to receive updates from the gateway of which IoT devices of the group of IoT devices are currently tethered, and wherein the gateway and the HSS are different devices;
receiving, from the gateway, a list of IoT devices within the group of IoT devices tethered to the gateway, wherein the tethering allows the group of IoT devices to connect to the network via the corresponding gateway;
developing, at the HSS, a master subscription exclusive to the group of Internet of Things (IoT);
associating the master subscription to an address for the gateway; and
upon receiving a query directed to a target IoT device of the group of IoT devices from a requesting device, using the master subscription to lookup the identifier address for the corresponding gateway and providing the address for the gateway to the requesting device, wherein the identifier address for the gateway enables transmitting a message from the requesting device to the gateway for routing to the target IoT device within the group of IoT devices.

8. The method of claim 7 comprising:
initiating the master subscription, at the HSS, via receipt of communication from the gateway with the group of IoT devices currently tethered to the gateway.

9. The method of claim 8 wherein initiating the master subscription at the HSS comprises:
attaching the gateway to a base station;
communication from the base station to a management mobile entity (MME); and
providing a communication from the MME to the HSS to initiate the master subscription at the HSS, wherein the communication includes the list of IoT devices.

10. The method of claim 7, further comprising:
querying the HSS for the master subscription associated with the target IoT device; in response to the query for the master subscription, receiving from the HSS the address for the gateway; and
transmitting a message intended for the target IoT device to the gateway using the address for the gateway.

11. The method of claim 7 wherein developing, at the HSS, the master subscription comprises:
assigning, at the HSS, to the master subscription an International Mobile Subscriber Identity (IMSI) that is provisioned for the group of IoT devices.

12. The method of claim 7 comprising:
directing a request to resolve a location of the target IoT device to the HSS; and
in response to the request to resolve the location of the target IoT device, providing an updated gateway associated with a different master subscription.

13. The method of claim 7 wherein the IoT devices are tethered to the gateway using a local networking technology.

14. The method of claim 7 wherein each master subscription is a one-to-one correspondence exclusive to each gateway.

15. A system, comprising:
a processing resource; and
a non-transitory machine-readable storage medium comprising instructions that when executed by the processing resource cause a networking device to:
identify a gateway in a network corresponding to a group of Internet of Things (IoT) devices, wherein the gateway is configured to provide a capability for a group of Internet of Things (IoT) devices to connect to the network, wherein a Home Subscriber Server (HSS) is configured to receive updates from the gateway to which IoT devices of the group of IoT devices are currently tethered, and wherein the gateway and the HSS are different devices;

receive, from the gateway, a list of IoT devices within the group of IoT devices tethered to the gateway, wherein the tethering allows the group of IoT devices to connect to the network via the corresponding gateway;

develop at the HSS, a master subscription exclusive to the group of Internet of Things (IoT) devices and the gateway;

associate the master subscription to an identifier for the gateway; and upon receiving a query directed to a target IoT device of the group of IoT devices from a requesting device, use the master subscription to lookup the identifier for the corresponding gateway and provide the identifier for the gateway to the requesting device, wherein the identifier for the gateway enables transmitting a message from the requesting device to the gateway for routing to the target IoT device within the group of IoT devices.

16. The system of claim 15 wherein to generate at the HSS the master subscription comprises instructions that when executed by the processing resource cause the networking device to:

assign the master subscription an International Mobile Subscriber Identity (IMSI) that is provisioned for the group of IoT devices.

17. The system of claim 15 comprising instructions that when executed by the processing resource cause the networking device to:

activate the master subscription at the HSS from the gateway to the HSS.

18. The system of claim 15 wherein the HSS manages multiple master subscriptions, and each master subscription is associated with a different gateway managing a different group of IoT devices.

19. The system of claim 15 comprising instructions that when executed by the processing resource cause the networking device to:

update the HSS, using diameter protocol, with the group of IoT devices tethered to the gateway.

20. The system of claim 15 comprising instructions that when executed by the processing resource cause the networking device to:

receive, at the HSS, a query for the master subscription for the target IoT device; and in response to the query, provide the identifier for the gateway.

* * * * *